United States Patent Office

2,819,234
Patented Jan. 7, 1958

2,819,234

COPOLYMERS OF ARYL OLEFINS AND ALPHA BETA ETHYLENICALLY UNSATURATED CARBOXYLIC ACID ESTERS OF OXIDIZED TALL OIL ESTERS

Lawrence H. Dunlap, Lancaster Township, Lancaster County, and Robert H. Reiff, Lancaster, Pa., assignors to Armstrong Cork Company, Lancaster, Pa., a corporation of Pennsylvania No Drawing. Application August 29, 1952
Serial No. 307,174

12 Claims. (Cl. 260—22)

This invention relates to copolymers of aryl olefins and alpha beta ethylenically unsaturated carboxylic acid esters of oxidized tall oil esters. More particularly, the invention relates to the production of such copolymers which are capable of use in the production of coatings and which are particularly adapted for use in the manufacture of floor covering as a binder for floor covering.

Copolymers of aryl olefins such as styrene with esters of fatty oils are known in the art. For example, Tawney in Patent 2,505,844 discloses the production of copolymers of castor oil maleates with mono-olefinic compounds such as styrene. However, such a copolymer cannot be used to produce a suitable floor covering material by commercially acceptable methods.

Tall oil is a by-product of the manufacture of sulphate pulp or kraft paper and is composed preponderantly of fatty acids, resin acids, unsaponifiable matter, and coloring impurities. Various uses have been made of this material, and methods have been proposed for selectively esterifying the material to remove rosin. Tall oil may be esterified with a number of polyhydric alcohols, such as glycerol, pentaerythritol, and the like, to produce tall oil esters. A typical example of the preparation of a tall oil ester is the following:

*Example I*

Tall oil having an acid number of 162, an iodine number of 160, containing 45.5% resin acids and 47.5% fatty acids, was esterfied by heating in a two liter, three necked round bottom flask with a 10% excess of pentaerythritol, using PbO as a catalyst. Suitable agitation was provided by $CO_2$ bubbled in at the base of the charge at 18 ml. per sec. The total charge was heated to 410° F. at a uniform rate in one hour. Litharge was added and the temperature uniformly advanced to 526° F. This required an additional half hour. The mixture was maintained at 526° F. for 6.5 hours, at which time the acid number was found to be 12, indicating nearly complete esterification of the tall oil.

In accordance with our invention, tall oil esters produced as indicated above are oxidized under such conditions that a minor amount of polymerization takes place. This is accomplished by oxidizing the esters in air in the presence of driers such as the naphthenates, tallates, and/or octoates of lead and/or manganese at a temperature such as about 40° C. to about 150° C., advantageously about 60° C. to about 100° C. The oxidation is conducted to a viscosity of 450 to 1500 seconds Gardner-Holdt at 25° C. Generally speaking, in order to attain the required viscosity in the practice of our invention, it is necessary to heat the ester in the presence of air for at least about 10 hours.

Following the production of the oxidized ester as indicated above, the material is esterified with an alpha beta ethylenically unsaturated carboxylic acid. Among the alpha beta ethylenically unsaturated carboxylic acids which we may employ in producing the ester of oxidized tall oil ester are such dicarboxylic acids as maleic acid, fumaric acid, itaconic acid, and the like; and such monocarboxylic acids as acrylic acid, methacrylic acid, crotonic acid, sorbic acid, and the like. It is also within the scope of our invention to use cyclic aliphatic acids such as tetrahydrophthalic acid, which is an adduct of maleic acid and butadiene, the adducts of cyclopentadiene and dicyclopentadiene with maleic acid, and similar cyclic aliphatic acids. Of course, where possible, the anhydrides of the acid may be employed in the practice of our invention.

In the esterification of the oxidized tall oil esters, the oxidized ester is advantageously refluxed with the alpha beta ethylenically unsaturated carboxylic acid or its anhydride. The refluxing is generally carried out while the reactants are dispersed in an inert hydrocarbon solvent such as benzene, toluene, xylene, and the like. The reflux temperatures are ordinarily between about 80° C. and about 150° C. and advantageously between about 100° C. and about 120° C. Generally speaking, we find it particularly advantageous to carry out the reaction when the reactants are present in the proportions of about 15 to about 17 parts of oxidized tall oil esters to about 1 part of carboxylic acid.

Esterification is continued with or without catalysts, such as sulfuric acid, until the acid number is reduced, preferably to about 65 or below.

In producing the copolymers, the oxidized and esterified tall oil esters are copolymerized with an aryl olefin such as styrene, alpha methyl styrene, paramethyl styrene, orthomethyl styrene, metamethyl styrene, parachloro styrene, paramethoxy styrene, and the like. Generally speaking, particularly advantageous results have been obtained when styrene is the aryl olefin which is reacted with the oxidized and esterified tall oil ester. These aryl olefins are all well-known vinyl aromatic compounds having the group $H_2C=C<$. Advantageous results have been obtained by polymerizing at elevated temperatures, such as about 60° C. to about 150° C., advantageously about 100° C. to about 120° C., a mixture in which the aryl olefin constitutes about 33% to about 67% of the polymerizable mixture, the balance being the esterified and oxidized tall oil ester. Particularly advantageous results have been obtained by polymerizing a mixture containing about equal parts by weight of aryl olefin and ester in an aromatic hydrocarbon solvent.

Our invention may be more readily understood by reference to the following specific examples, which are given by way of illustration and not by limitation:

*Example II*

A pentaerythritol ester of tall oil prepared in the manner indicated in Example I having an original acid number of 12 to 15 and a viscosity of Z-3 by Gardner-Holdt bubble tubes was oxidized for 10 hours at 80° C., at the end of which time the viscosity was 513 seconds Gardner-Holdt. 150 g. of oxidized ester were then dissolved in an equal weight of toluene and 10 g. of maleic anhydride were added. The mixture was heated at about 110° C. for 4 hours to a fairly low acid number, below 12 to 15. Styrene in an amount equal to the weight of oxidized ester and benzoyl-peroxide (1% by weight of the styrene) were added and refluxed 5 hours at 110° to 120° C. The toluene was distilled off and a clear, tough, tacky gel capable of being heat converted to a cured condition was obtained.

*Example III*

400 g. of pentaerythritol esters of tall oil having an acid number of 90.1 and a rosin acid number of 80 were placed in a laboratory alkyd kettle with 34.0 g. of diethylene glycol. The mixture was heated with stirring to 150° to 250° C. while being blown with $CO_2$ until the acid number was reduced to 11.3. The tall oil esters so produced were air blown with lead-manganese driers for 10 hours at 80° C. until the Gardner-Holdt viscosity of the oxidized product was 1500 sec. at 25° C.

Following the production of the oxidized ester as described above, 173 g. of the 1500 sec. viscosity product and 9.0 g. of maleic anhydride were dissolved in 200 ml. of toluene and refluxed at 110° to 115° C. with stirring for five hours. The esterified material was styrenated by the addition of 180 g. of styrene plus 1.8 g. of benzoyl peroxide in 200 ml. of toluene. The mixture was heated with stirring to refluxing temperature, 110° to 115° C. for about five hours. On removal of the solvent, by distillation under reduced pressure, it was noted that a tough, tacky gel capable of being converted to a cured condition was obtained.

The products of our invention are suited for a wide variety of uses and as intermediates in the production of other materials. For example, the products may be employed as a binder for floor covering. To produce a floor covering, the product of Example II may be compounded with pigments and filler and formed into a sheet which may be stoved in conventional floor covering manufacturing equipment. The following example is illustrative of a floor covering composition:

Example IV

|  | Percent |
|---|---|
| Product of Example II | 37 |
| Wood flour | 24 |
| Whiting | 39 |

The sheets obtained by calendering this composition were cured in 378 hours to an indentation of about 30%. The alkali resistance was demonstrated by pressing the binder on stainless steel screening and immersing it in 1% aqueous NaOH solution. In 12 hours regular linoleum cement comprising oxidized linseed oil-rosin gel was completely dissolved, whereas the product of Example II was not observably changed.

The products of our invention are also adapted for use in the preparation of coating material. In the preparation of a coating, the oxidized ester is held in solution of a suitable solvent such as toluene and is thereafter reacted with styrene or other aryl olefin to form the copolymer. The resulting solution of copolymer may be applied by brush, spray, etc., to wood, glass, metal, and similar substances. The coated materials may be either air dried or baked to form a clear homogeneous film of superior alkali resistance.

The usual reinforcing resins common to varnishes may be added. Typical examples of such resins are malamine-formaldehyde resins, phenol-formaldehyde resins, urea-formaldehyde resins, and the like. The products give harder films that are fast drying. The films are characterized by good water and alkali resistance and are comparatively inexpensive to produce.

We claim:

1. A method of producing valuable polymers comprising esterifying an oxidized polyhydric alcohol ester of tall oil having a viscosity of 450 to 1500 seconds Gardner-Holdt at 25° C. with an alpha beta ethylenically unsaturated carboxylic acid free of ester groups and copolymerizing the resulting ester with a vinyl aromatic compound containing a single vinyl group at elevated temperatures of about 60° C. to about 150° C.

2. A method of producing valuable polymers comprising esterifying an oxidized polyhydric alcohol ester of tall oil having a viscosity of 450 to 1500 seconds Gardner-Holdt at 25° C. with an alpha beta ethylenically unsaturated monocarboxylic acid free of ester groups and copolymerizing the resulting ester with a vinyl aromatic compound containing a single vinyl group at elevated temperatures of about 60° C. to about 150° C.

3. A method of producing valuable polymers comprising esterifying an oxidized polyhydric alcohol ester of tall oil having a viscosity of 450 to 1500 seconds Gardner-Holdt at 25° C. with an alpha beta ethylenically unsaturated dicarboxylic acid free of ester groups and copolymerizing the resulting ester with a vinyl aromatic compound containing a single vinyl group at elevated temperatures of about 60° C. to about 150° C.

4. A method of producing valuable polymers comprising refluxing an oxidized polyhydric alcohol ester of tall oil having a viscosity of 450 to 1500 seconds Gardner-Holdt at 25° C. with an alpha beta ethylenically unsaturated carboxylic acid free of ester groups while dispersed in a hydrocarbon solvent and copolymerizing the resulting ester with a vinyl aromatic compound containing a single vinyl group in the presence of a hydrocarbon solvent at elevated temperatures of about 60° C. to about 150° C.

5. A method of producing valuable polymers comprising refluxing an oxidized polyhydric alcohol ester of tall oil having a viscosity of 450 to 1500 seconds Gardner-Holdt at 25° C. with an alpha beta ethylenically unsaturated carboxylic acid free of ester groups while dispersed in a hydrocarbon solvent and copolymerizing the resulting ester with styrene in the presence of a hydrocarbon solvent at elevated temperatures of about 60° C. to about 150° C.

6. A method of producing valuable polymers comprising esterifying an oxidized polyhydric alcohol ester of tall oil having a viscosity of 450 to 1500 seconds Gardner-Holdt at 25° C. with maleic acid and copolymerizing the resulting material with a vinyl aromatic compound containing a single vinyl group at elevated temperatures of about 60° C. to about 150° C.

7. A copolymer of a vinyl aromatic compound containing a single vinyl group and the reaction product of an alpha beta ethylenically unsaturated carboxylic acid free of ester groups and an oxidized polyhydric alcohol ester of tall oil having a viscosity of 450 to 1500 seconds Gardner-Holdt at 25° C.

8. A copolymer of a vinyl aromatic compound containing a single vinyl group and the reaction product of an alpha beta ethylenically unsaturated monocarboxylic acid free of ester groups and an oxidized polyhydric alcohol ester of tall oil having a viscosity of 450 to 1500 seconds Gardner-Holdt at 25° C.

9. A copolymer of a vinyl aromatic compound containing a single vinyl group and the reaction product of an alpha beta ethylenically unsaturated dicarboxylic acid free of ester groups and an oxidized polyhydric alcohol ester of tall oil having a viscosity of 450 to 1500 seconds Gardner-Holdt at 25° C.

10. A copolymer of a vinyl aromatic compound containing a single vinyl group and the reaction product of an alpha beta ethylenically unsaturated carboxylic acid free of ester groups and the oxidized pentaerythritol ester of tall oil having a viscosity of 450 to 1500 seconds Gardner-Holdt at 25° C.

11. A floor covering composition comprising a filler and a binder therefor, said binder comprising a copolymer of a vinyl aromatic compound containing a single vinyl group with the reaction product of an alpha beta ethylenically unsaturated carboxylic acid free of ester groups and an oxidized polyhydric alcohol ester of tall oil having a viscosity of 450 to 1500 seconds Gardner-Holdt at 25° C.

12. A coating composition comprising a hydrocarbon solvent containing a copolymer of the reaction product of an alpha beta ethylenically unsaturated carboxylic acid free of ester groups and an oxidized polyhydric alcohol ester of tall oil having a viscosity of 450 to 1500 seconds Gardner-Holdt at 25° C. and a vinyl aromatic compound containing a single vinyl group.

References Cited in the file of this patent

UNITED STATES PATENTS

| 2,503,772 | Rust | Apr. 11, 1950 |
| 2,514,389 | Glick | July 11, 1950 |
| 2,590,654 | Schmutzler | Mar. 25, 1952 |